United States Patent [19]
Frazier et al.

[11] Patent Number: 6,045,204
[45] Date of Patent: Apr. 4, 2000

[54] OVERHEAD STOWAGE BINS IN AIRCRAFT

[75] Inventors: Joe K. Frazier; Robert J. Shimota; Gary L. Ferson, all of Bellingham, Wash.

[73] Assignee: Hexcel Corporation, Kent, Wash.

[21] Appl. No.: 09/170,606

[22] Filed: Oct. 13, 1998

[51] Int. Cl.⁷ .................................................. A47F 5/08
[52] U.S. Cl. ....................... 312/247; 312/269; 16/370; 244/118.1; 244/118.5
[58] Field of Search ................ 16/370, 360, 366; 312/245, 246, 247, 266, 312, 325; 244/118.1, 118.2, 118.5

[56] References Cited

U.S. PATENT DOCUMENTS

| 3,758,990 | 9/1973 | Balanos | 16/370 |
| 4,275,942 | 6/1981 | Steidl | 312/247 |
| 4,622,715 | 11/1986 | Buckley | 16/370 |

FOREIGN PATENT DOCUMENTS

| 258063 | 11/1969 | Russian Federation | 16/370 |

*Primary Examiner*—Peter M. Cuomo
*Assistant Examiner*—Gerald A. Anderson
*Attorney, Agent, or Firm*—Delbert J. Barnard

[57] ABSTRACT

The invention provides a high cost saving method of achieving restricted bin motion. A linkage that supports an overhead stowage bin (22) in an aircraft (12) and is operable for moving the stowage bin (22) between open and closed positions. The linkage includes an upper link (26), a lower link (28') and a gas spring (36). The gas spring (36) is pivotally connected at an upper first end to the upper link (26) and at a lower second end to the lower link (28'). Modifying apparatus comprises an additional link (56) that is connectable at a first end to the upper link (26) and at a second end to the first end of the gas spring (36). A new or extended existing lower link (28) may be used. This apparatus changes the location of the pivotal connection (40) of the upper end of the gas spring (36) to the upper link (26), so as to change the open position of the overhead stowage bin (22) in a way that lessens projection of the stowage bin (22) into aisle space (18) when the stowage bin (22) is in its open position.

12 Claims, 6 Drawing Sheets

OVERHEAD STOWAGE BINS IN AIRCRAFT

TECHNICAL FIELD

This invention relates to overhead stowage bins in aircraft and, more particularly, to the provision of a low cost way of changing the open-position attitude of existing center-seats stowage bins as a part of a seat size reconfiguration of a passenger cabin.

BACKGROUND OF THE INVENTION

It is common practice to provide different seat widths in different portions of an aircraft passenger cabin. It is also common practice to in a given cabin region change the seat size, usually be replacing seats of a first size with seats of a second size. The change in seat size also changes the position of the aisles between seat groups. In a typical wide body aircraft cabin, the seats are divided into three longitudinal groups. There are two side groups, a center group and two aisles, one between each side group and the center group. In some seating sections there are seven seats per row, with each side group having two seats in the row and the center group having three seats in the row. In other seating sections there are six seats per row composed of two seats from each group. Herein, the configuration of seven seats per row will be referred to as a "narrow seat" configuration. The configuration of six seats per row will be referred to as a "wide seat" configuration.

The reconfiguration of a cabin from seven seats per row to six seats per row moves the aisles closer to the center of the aircraft. As disclosed in U.S. Pat. No. 4,275,942, granted Jun. 30, 1991 to Robert H. Steidl, and assigned The Boeing Company of Seattle, Wash. the center-seats stowage bins have two positions, a retracted or stowed position and an extended or open position. When the stowage bins for the center seats are initially positioned for access from the aisles of a seven seat per row configuration, a problem can develop when six wider seats are substituted for the seven seats. The aisle location is moved inwardly to where the stowage bins for the center seats, when open, will obstruct the aisle space if left unchanged. This invention provides a way of utilizing the existing stowage bins and some of the existing support linkage for the stowage bins, for repositioning the open position of the stowage bins for the center seats, so that when open the open stowage bins will not obstruct the relocated aisles. This invention involves a simple and low cost revision of the prior art stowage bin and support linkage that is disclose by U.S. Pat. No. 4,275,942. The contents of this patent are incorporated herein by this specific reference.

Presently the bin restriction is achieved by replacing both the upper and lower links which is a high cost modification. This invention has a high cost saving and achieves the same restriction desires by modifying the upper link and replacing or modifying the lower link. At today's costs, the use of a modified upper link will save several thousand dollars per stowage bin.

DISCLOSURE OF THE INVENTION

This invention provides apparatus for modifying an existing four-bar linkage that supports an overhead storage bin in an aircraft and is operable for moving the stowage bin between open and closed positions. The existing four-bar linkage comprises a longitudinal torsion bar mounted for rotation at a forward and upward position, an upper link having a forward end rigidly attached to the torsion bar and a rearward end that is pivotally connected to an upper rear portion of the stowage bin, a lower link having a rearward end that is pivotally attached to a lower rearward portion of the stowage bin and a forward end attached to a gas spring that is pivotally connected at an upper first end to the upper link. The apparatus includes a replacement lower link that is longer than the lower link that it replaces and an additional link that is connected at a first end to the upper link and at a second end to the first end of the gas spring, for changing the location of the pivotal connection of the upper end of the gas spring to the upper link. The additional link is connected at a first end to the upper link and at a second end to the first end of the gas spring. The additional link changes the location of the pivotal connection of the upper end of the gas spring to the upper link. The pivotal mount for the rearward end of the upper link is positioned to connect the rearward end of the upper link to a location on the stowage bin that is below the former location of this pivotal connection. The pivot mount for the rearward end of the replacement lower link is positioned to pivotally connect the rearward end of the replacement lower link to a lower rearward portion of the stowage bin at a location that is rearwardly and above the pivotal connection for the rear end of the lower link that is being replaced. The link addition is sized and positioned, and the pivotal mounts for the rearward end of the replacement lower link and the rearward end of the upper link are chosen such that the apparatus changes the open position of the overhead stowage bin in a way that lessens projection of the stowage bin into aisle space when the stowage bin is in its open position.

According to an aspect of the invention, the upper link includes a forward elongated main arm and a stub arm that extends laterally from the main arm at a location between the opposite ends of the main arm. The first end of the additional link is connected to the stub arm and the additional length extends outwardly and down from the stub arm.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, and.

BEST MODE FOR CARRYING OUT THE INVENTION

Owing to the nature of the invention, it is necessary to describe the prior art before describing an embodiment of the invention. The prior art is disclosed in the aforementioned U.S. Pat. No. 4,275,942. FIGS. 1–4 herein are essentially identical to FIGS. 1–4 of U.S. Pat. No. 4,275,942.

Figure 1:
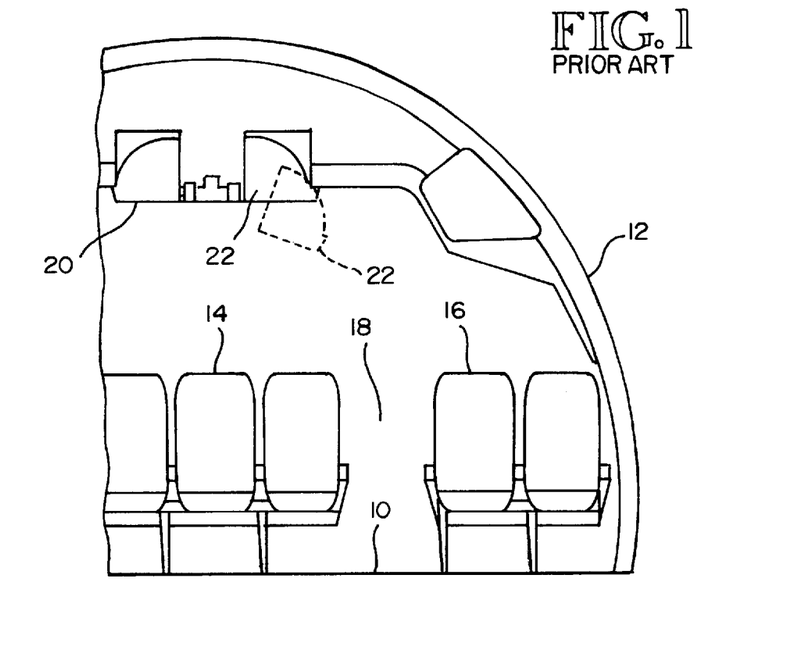
FIG. 1 is a fragmentary transverse sectional view of an airplane fuselage, showing a prior art arrangement of seats and stowage bins.

The aircraft shown by FIG. 1 is a passenger aircraft having seats arranged in three longitudinal groups separated by two longitudinal aisles. In the illustrated seat configuration, each row of seats comprises seven seats, two on each side and three in the middle. The seats are supported on a floor structure 10 that is secured to the fuselage 12. The center three seats are designated 14. The two side seats are designated 16. The aisle is designated 18.

FIG. 1 includes a solid line showing of stowage bins 20, 22 in their closed or stowed positions and a broken line showing of stowage bin 22 in its down or open position. As stated in U.S. Pat. No. 4,275,942, it is necessary that the stowage bins 20, 22 be sufficiently above the floor to 10 provide adequate head room for easy access to the seats 14 when such stowage bins 20, 22 are in their retracted or stowed positions. It is also necessary that when the stowage bins 20, 22 are in their extended or down positions, they should be sufficiently low enough to prevent easy access to the stowage space in the bins 20, 22 but at the same time should be positioned to not obstruct the aisle 18.

Figure 2:
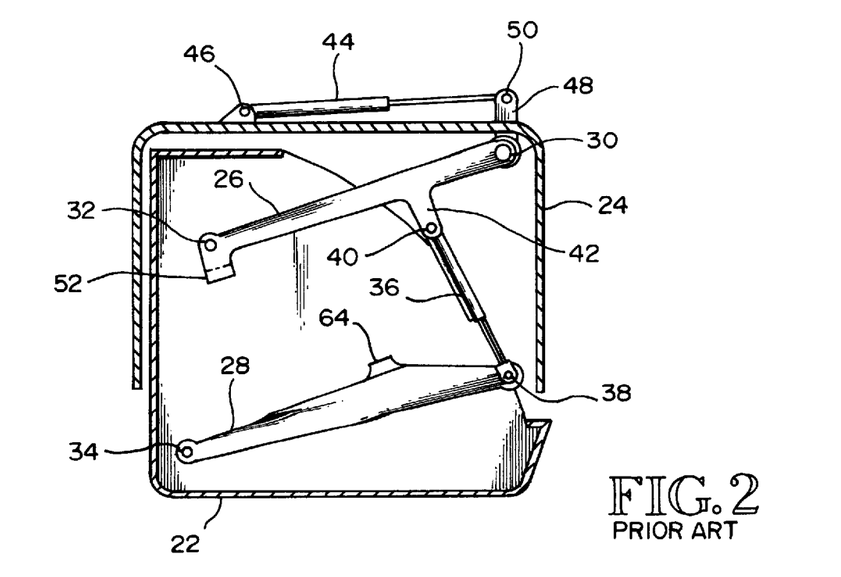
FIG. 2 is a transverse sectional view through a prior art stowage bin, showing it and its supporting linkage in their retracted or stowed positions.
Figure 3:
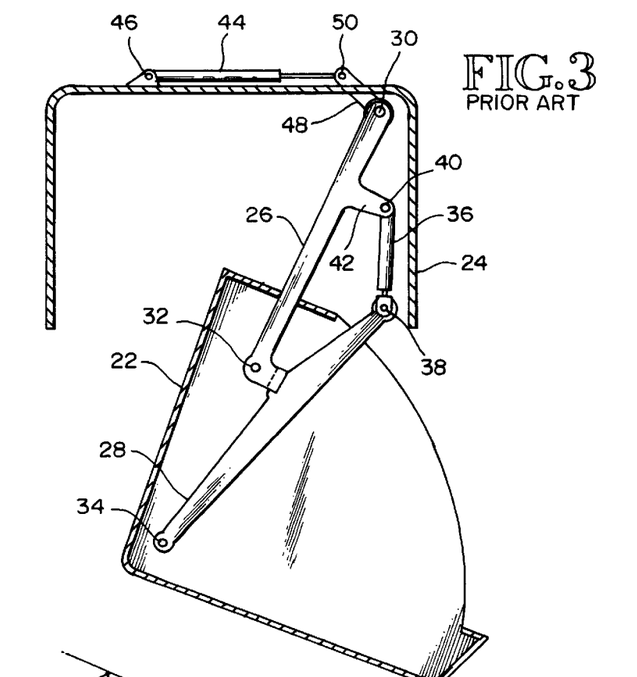
FIG. 3 is a view like FIG. 2 but showing the prior art stowage bin and its supporting linkage in their extended or open positions.
Figure 4:
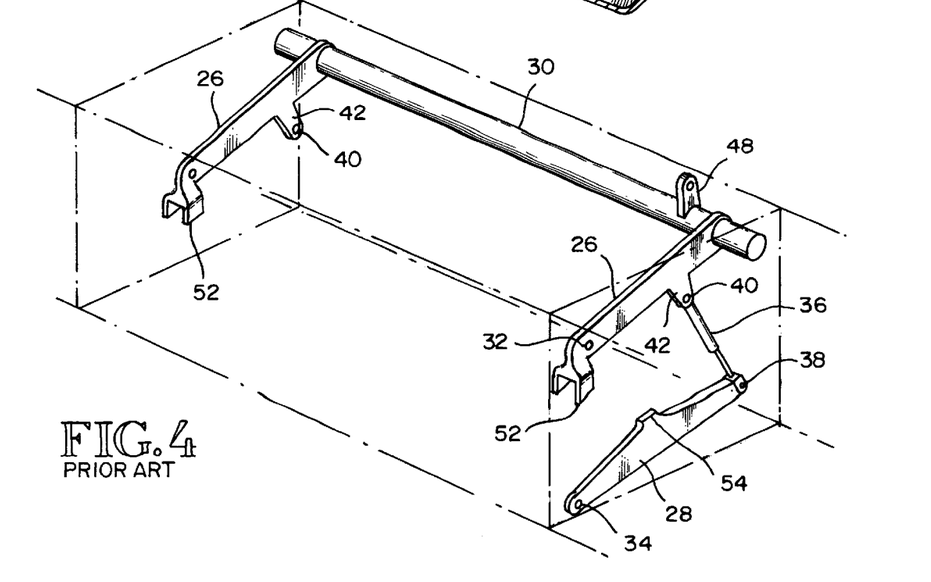
FIG. 4 is a pictorial view of portions of the prior art supporting linkage for the prior art stowage bin.

The prior art structure for supporting the stowage bins is shown by FIGS. 2–4. It includes a longitudinal inverted channel 24 provided with longitudinally spaced apart transverse bulkheads (not shown). Fitting within the supporting structure 24 are the bins 20, 22. Each bin 20, 22 has a somewhat C-shaped cross section. Each bin 20, 22 is supported and guided by linkage that includes two sets of upper and lower links 26, 28. There is one set of links at each longitudinal end of each bin 20, 22. Each upper link 26 is connected at its forward or aisle end to a longitudinal torque tube 30. The opposite or inner end of each link 26 is pivotally connected to the stowage bin 22 at 32. The inner end of each lower link 28 is pivotally connected to the bin 22 at 34. The opposite or aisle end of each link 28 is pivotally connected to the lower end of a gas spring 36 at 38. The upper end of the gas spring 36 is pivotally connected to the upper link 26 at 40. Upper link 26 is provided with a stub portion 42 that projects substantially perpendicular downwards from the main portion of link 26, at a location between the end connections 30, 32, but closer to connection 30. As illustrated, the torque tube 30 and the pivotal connection 38 are vertically spaced apart on the aisle side or "front" of the structure. The two pivot points 32, 34 are closer to the center line of the aircraft, or at the "back" of the bin 22. The structure between torque tube 30, pivot joint 38, the upper link 26 between torque tube 30 and the pivot connection 32, the bin 22 between pivot connections 32 and 34, and the lower link 28 between pivotal connections 34 and 38 together in effect constitute a four-bar linkage, the links of which are of unequal lengths.

As is understood in the art, the changing lengths of the links of the four-bar linkage acts to provide a variety of positions and attitudes for the stowage bin as it travels between its open and retracted position. The lengths of the links and the location of the pivot connections are chosen such that as the stowage bin 22 moves downwardly from stowed position to its open position, the stowage bin 22 will move principally downwardly but slightly forwardly, towards the aisle, and will tilt slightly so that its forward or aisle side is lower than its back side, as shown by FIG. 3, for example. In its extend or down position, the stowage bin 22 is within easy reach of a user, but it does not obstruct the aisle 18 between the seat groups 14 and 16.

The gas spring 36 is a piston-cylinder assembly that comprises gas under pressure. Gas spring 36 is one example of a spring cartridge or biasing structure that can be used to counterbalance the weight. The gas spring, or a substituted equivalent structure, serves to counterbalance the weight of the stowage bin 22 and its contents. It resists downward motion of the upper link 26 and the stowage bin 22. Gas spring 36 provides a counterbalancing moment acting on the torque tube 30. As the stowage bin 22 is lowered, the gas spring 36 is compressed and its force increases. However, the effective moment arm of the force about the axis of torque tube 30 decreases so that the counterbalancing moment is fairly constant until the stowage bin 22 is almost fully open. When the stowage bin 22 is almost fully open, the gas spring 36 goes "overcenter," as shown in FIG. 3. That is, pivot point 40 moves to the right (as shown) of a line joining torque tube 30 and pivot joint 38.

A snubbing device 44 is provided to control the drop rate, particularly when the stowage bin 22 is heavily loaded. The snubbing device 44 is preferably "dry," i.e. it operates on frictional principles without the use of a compressible fluid. As shown by FIGS. 2 and 3, an inner end of the snubbing device 44 is pivotally connected to structure 24 at 46. The opposite end of snubbing device 44 is pivotally connected to an arm 48 at 50. Arm 48 is secured to and projects radially from the torque tube 30 (FIG. 4).

The down or open position for the stowage bin 22 is conveniently established by an interengagement of the upper and lower links 26, 28. The upper link includes a fork-shaped abutment 52 that engages an abutment 54 on the lower link 28 (FIG. 4). Interengagement of the abutments 52, 54 does two things. Firstly, it limits further downward travel of the stowage bin 22. Secondly, it provides rigidity to the linkage structure in the lateral direction which is fore-and-aft in the aircraft. The forks of the abutments 52 may be appropriately radiused and lined with a low friction material for ease of seating upon and about the abutments 54 when the stowage bin 22 is in its open position. In such position, the inside surfaces of the forks make a snug engagement with the sides of the abutments 54 and the lower link 28. This provides rigidity and stability against movement of the stowage bin 22 in the lateral direction when it is fully open.

As best shown by FIG. 4, the two upper links 26 and the arm 48 to which the snubbing device 44 is secured, are each rigidly affixed to the torque tube 30. The torque tube 30 is preferably quite rigid under torsional loads, so as to force the two upper arms 26 to work together.

Figure 5:
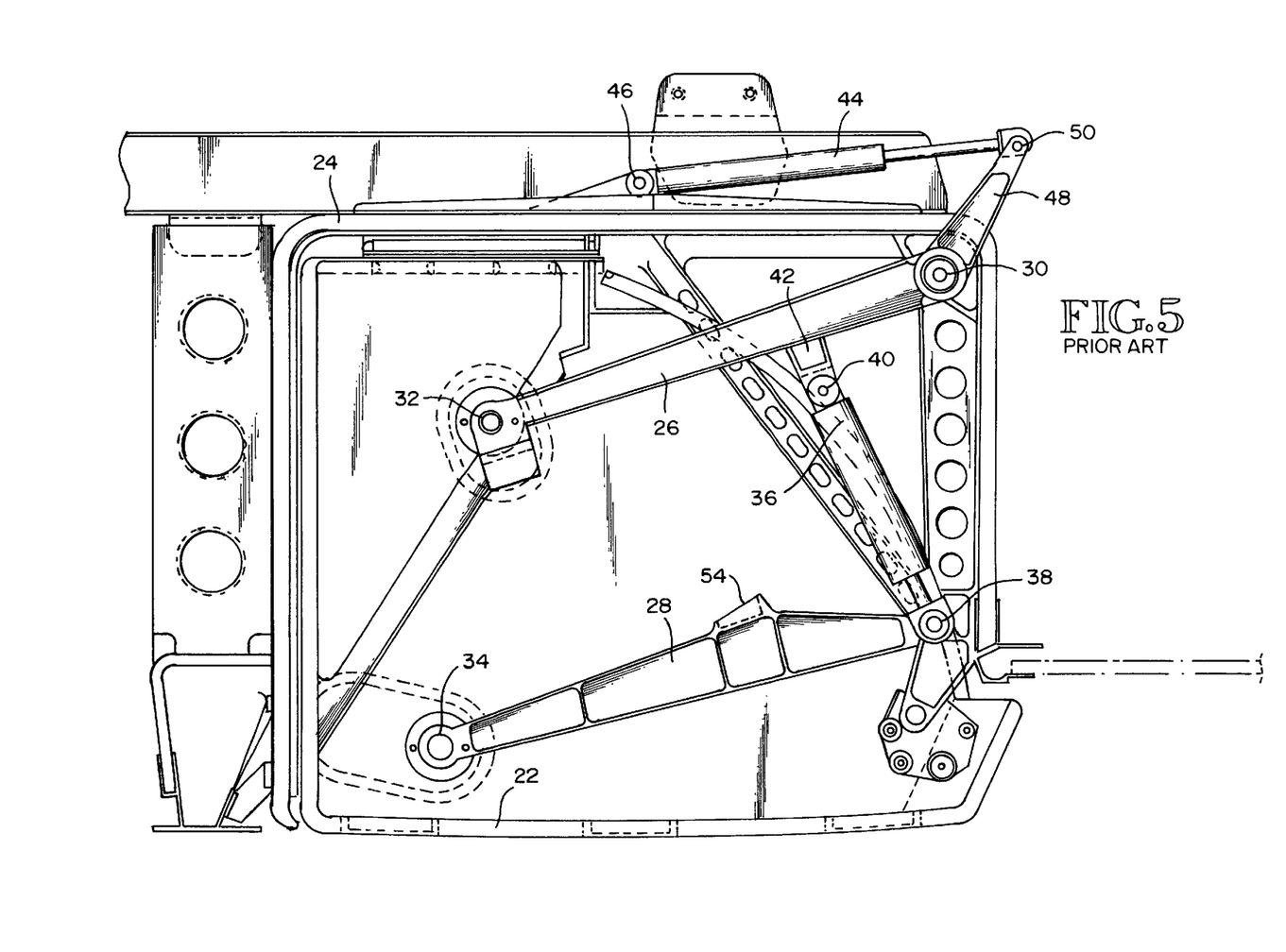
FIG. 5 is a view similar to FIG. 2 but showing more detail of the prior art stowage bin and its supporting linkage.
Figure 6:
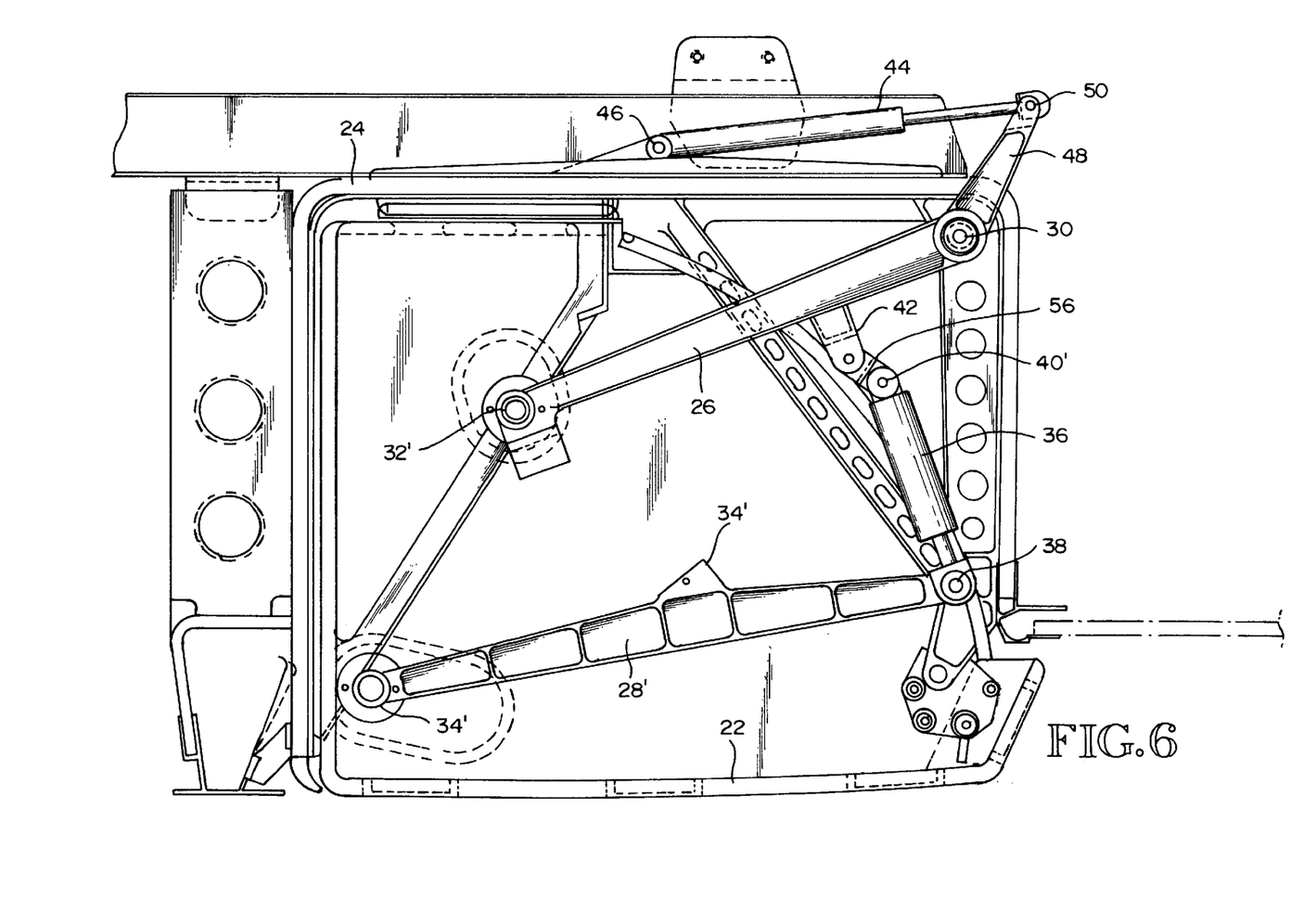
FIG. 6 is a view like FIG. 5 but showing linkage that has been modified in accordance with the present invention.

The present invention can be best understood by comparing FIG. 5 of the drawing with FIG. 6. In preferred form, the stowage bin 22, the support structure 24, the upper link 26, the gas spring 36 and the snubber 44 remain unchanged. The changes are: an additional link 56 is provided, the original lower link 28 is replaced by a new, longer lower link 28'. The mounts for the inner ends of the upper and lower links 26, 28' are changed or repositioned to move where the inner ends of the links 26, 28' are connected to the stowage bin 22. Comparing FIG. 6 with FIG. 5, the location of the pivotal connection of the rearward end of link 26 to the stowage bin 22 has been moved from location 32 to location 32'. Location 32' is below and forwardly from the location 32. Similarly, for the rearward end of link 28 the location 34' is rearwardly and upwardly from the location 34. The additional link 56 can be connected to the stub arm 42 or to the main body of the link 26. It is rigidly connected to the link 26 and is sized and positioned so that there is a change in the location of the pivot pin connection between the upper link 26 and gas spring 36. This pivotal connection is designated 40' in FIG. 6. A comparison of location 40' in FIG. 6 with 40 in FIG. 5 will show that this pivotal connection is both lowered and moved forwardly from the prior pivotal connection at 40.

There is a need for replacing the lower link 28 with a new lower link 28'. The new lower link 28' is longer than the original lower link 28. The abutment 54' is positioned further away from the gas spring pivot joint 38 than the abutment 54.

Figure 7:
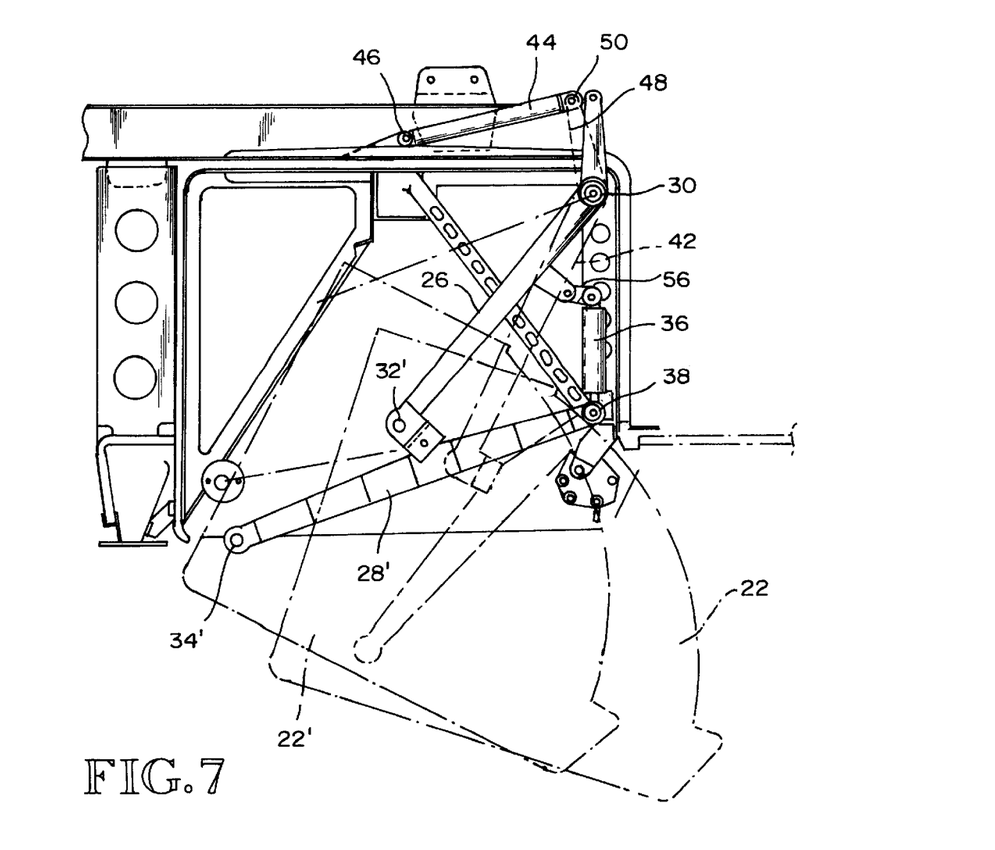
FIG. 7 is a view of the stowage bin and supporting linkage shown by FIG. 6, with two broken line showings of the stowage bin in two open positions, one such position corresponding to the position of the stowage bin shown by FIG. 3 and the other showing the changed open position of the stowage bin caused by the modifications to the supporting linkage per this invention.

FIG. 7 shows two broken line showings of the stowage bin 22 when in its open position. The position designated 22 corresponds to the position shown in FIG. 3. The position designated 22' is the restricted position resulting from the modifications made by use of the present invention.

The link 56 has a first, upper end adapted to connect to the opening in stub arm 42. It has a second, opposite end adapted to pivotally connect to the gas spring 36. The connection of link 56 to stub arm 42 is a fixed connection. That is, link 56 is fixed in position relative to stub arm 42. There is no relative rotation or movement between the members 42, 56.

Figure 8:
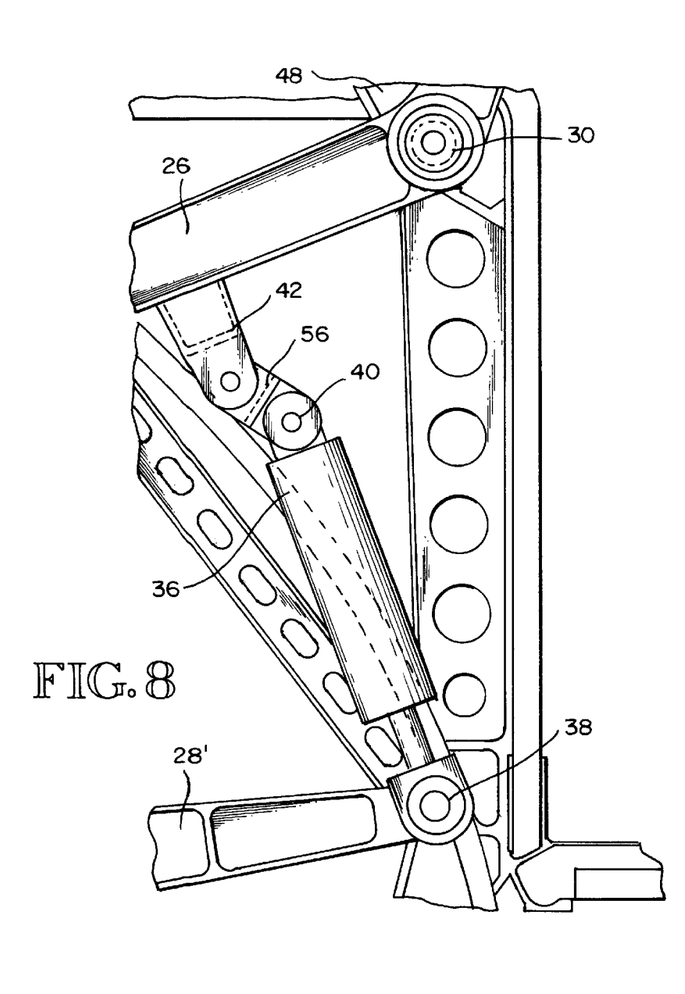
FIG. 8 is an enlarged scale fragmentary view of a portion of the supporting linkage, showing an additional link that has been added, and showing the stowage bin and the supporting linkage in their retracted or stowed positions.
Figure 9:
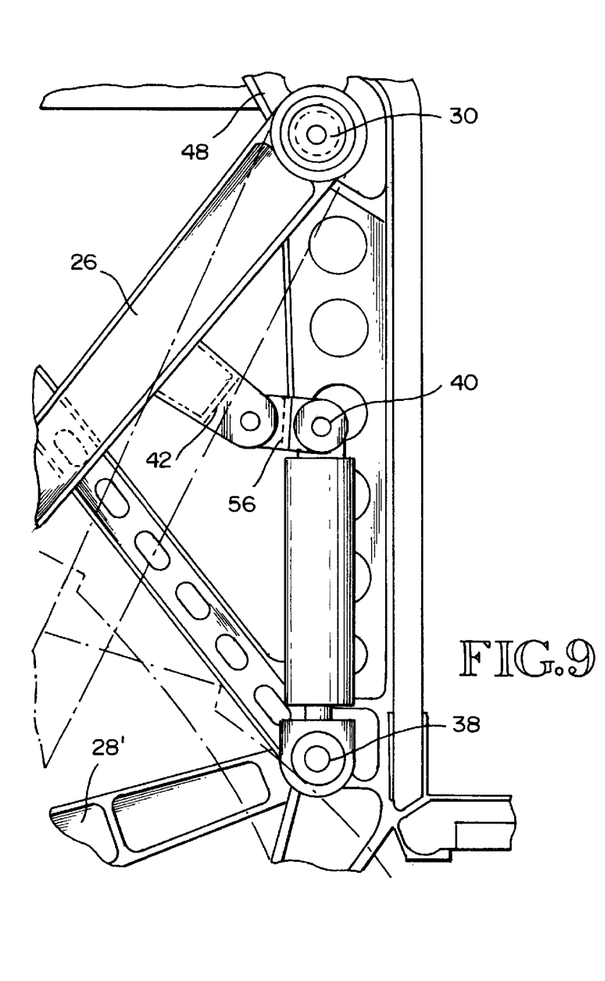
FIG. 9 is a view like FIG. 8 but showing the stowage bin and the supporting linkage in their down or open position.

FIGS. 8 and 9 show the two positions of the link 56 when the stowage bin 22 is closed and opened. FIG. 8 shows the position when the stowage bin 22 is closed. FIG. 9 shows the position when the stowage bin 22 is open. In FIG. 9, the pivot connection 40 is over center.

Figure 10:
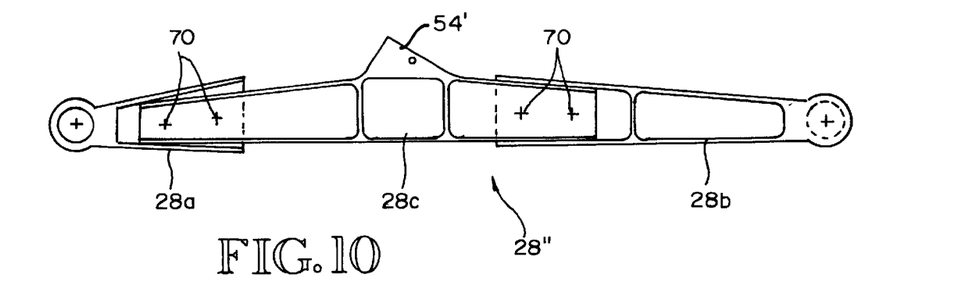
FIG. 10 is a side view of a new lower link composed of end portions of an old link and a new center portion.

FIG. 10 shows a lower link 28" that can be used in place of lower link 28' shown in FIG. 6. Link 28" is composed of end portions 28A and 28B which are end portions of the existing lower link 28 shown in FIG. 5. Lower link 28" also includes a center section 28C which is new manufacture. When it is desired to replace a seat group shown in FIG. 1 with fewer seats that are wider, the old lower links 28 can be cut to form the end portions 28A, 28B and the new center portion 28C can be added and be connected to the ends portions 28A, 28B by fasteners 70. This modification may be added to the other modifications described above in connection with the installation shown by FIG. 6.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. In combination, an overhead stowage bin in an aircraft that includes linkage that supports the overhead stowage bin and is operable for moving the storage bin between open and closed positions, said linkage including an upper link, a lower link, and a gas spring that is pivotally connected at an upper first end to the upper link and at a lower second end to the lower link, and apparatus for modifying said linkage comprising an additional link that is connected at a first end to the upper link and at a second end to the first end of the gas spring, such apparatus changing the location of the pivotal connection of the upper end of the gas spring to the upper link, so as to change the open position of the overhead stowage bin in a way that lessens projection of the stowage bin into aisle space when the stowage bin is in its open position.

2. The combination of claim 1, wherein the upper link includes an elongated main arm and a stub arm that extends laterally from the main arm at a location between the opposite ends of the main arm, and wherein said first end of the additional link is connected to the stub arm and the additional link extends endwise outwardly from the stub arm to a pivotal connection with the upper end of the gas spring.

3. The combination of claim 1, wherein the upper link includes a forward first end that is rigidly attached to a torsion bar and a rearward second end that is pivotally connected to an upper rear portion of the stowage bin.

4. The combination of claim 3, wherein the upper link includes an elongated main arm and a stub arm that extends laterally from the main arm at a location between the opposite ends of the main arm, and wherein said first end of the additional link is connected to the stub arm and the additional link extends endwise outwardly from the stub arm to a pivotal connection with the upper end of the gas spring..

5. The combination of claim 2, wherein the lower link includes a rearward end that is pivotally attached to a rearward, lower portion of the stowage bin, and a forward end, wherein the lower second end of the gas spring is pivotally connected to the forward end of the lower link, wherein the linkage includes a snuber connected at a rearward first end to frame structure and at a forward second end to the torsion bar.

6. The combination of claim 3, wherein the lower link includes a rearward end that is pivotally attached to a rearward, lower portion of the stowage bin, and a forward end, wherein the lower second end of the gas spring is pivotally connected to the forward end of the lower link, wherein the linkage includes a linear motor connected at a rearward first end to frame structure and at a forward second end to the torsion bar, and wherein said linear motor is adapted to rotate the torsion bar to in that manner operate the linkage for moving the stowage bin between open and closed positions.

7. The combination of claim 5, wherein the upper and lower links include engaging portions that move together as the stowage bin moves from its closed position to its open position and move apart when the stowage bin moves from its open position to its closed position, said engaging portions contacting each other when the stowage bin is in its open position.

8. Apparatus for modifying an existing four-bar linkage that supports an overhead stowage bin in an aircraft and is operable for moving the stowage bin between open and closed positions, said four-bar linkage comprising a torsion bar mounted for rotation at a forward and upward position, an upper link having a forward end rigidly attached to the torsion bar and a rearward end that is pivotally connected to an upper rear portion of the stowage bin, a lower link having a rearward end that is pivotally attached to a lower rearward portion of the stowage bin and a forward end, and a gas spring that is pivotally connected at an upper first end to the upper link and at a lower second end to the forward end of the lower link, said apparatus comprising:

a replacement lower link that is longer than the lower link that it replaces;

a pivot mount for the rearward end of the replacement lower link adapted to pivotally connect the rearward end of the replacement lower link to a lower rearward portion of the stowage bin at a location that is rearwardly and above the pivotal connection for the rear end of the lower link that is being replaced;

an additional link that is connected at a first end to the upper link and at a second end to the first end of the gas spring, for changing the location of the pivotal connection of the upper end of the gas spring to the upper link;

a pivotal mount for the rearward end of the upper link adapted to pivotally connect the rearward end of the upper link to a location on the stowage bin that is below the former location of the pivotal connection; and said apparatus changing the open position of the overhead stowage bin in a way that lessens projection of the stowage bin into aisle space when the stowage bin is in its open position.

9. Apparatus according to claim 8, wherein the upper link includes an elongated main arm and a stub arm that extends laterally from the main arm at a location between the opposite ends of the main arm, and wherein said first end of the additional link is connected to the stub arm and the additional link extends endwise outwardly from the stub arm.

10. Apparatus according to claim 8, wherein the upper and lower links include engaging portions that move together as the stowage bin moves from its closed position to its open position and moves apart when the stowage bin moves from its open position to its closed position, said engaging portions contacting each other when the stowage bin is in its open position.

11. Apparatus according to claim 9, wherein the upper and lower links include engaging portions that move together as the stowage bin moves from its closed position to its open position and moves apart when the stowage bin moves from its open position to its closed position, said engaging portions contacting each other when the stowage bin is in its open position.

12. Apparatus according to claim 8, wherein the replacement lower link comprises the opposite end portions of an original lower link, and a new center portion that is connected to the two end portions to form a replacement lower link.

* * * * *